Patented June 7, 1927.

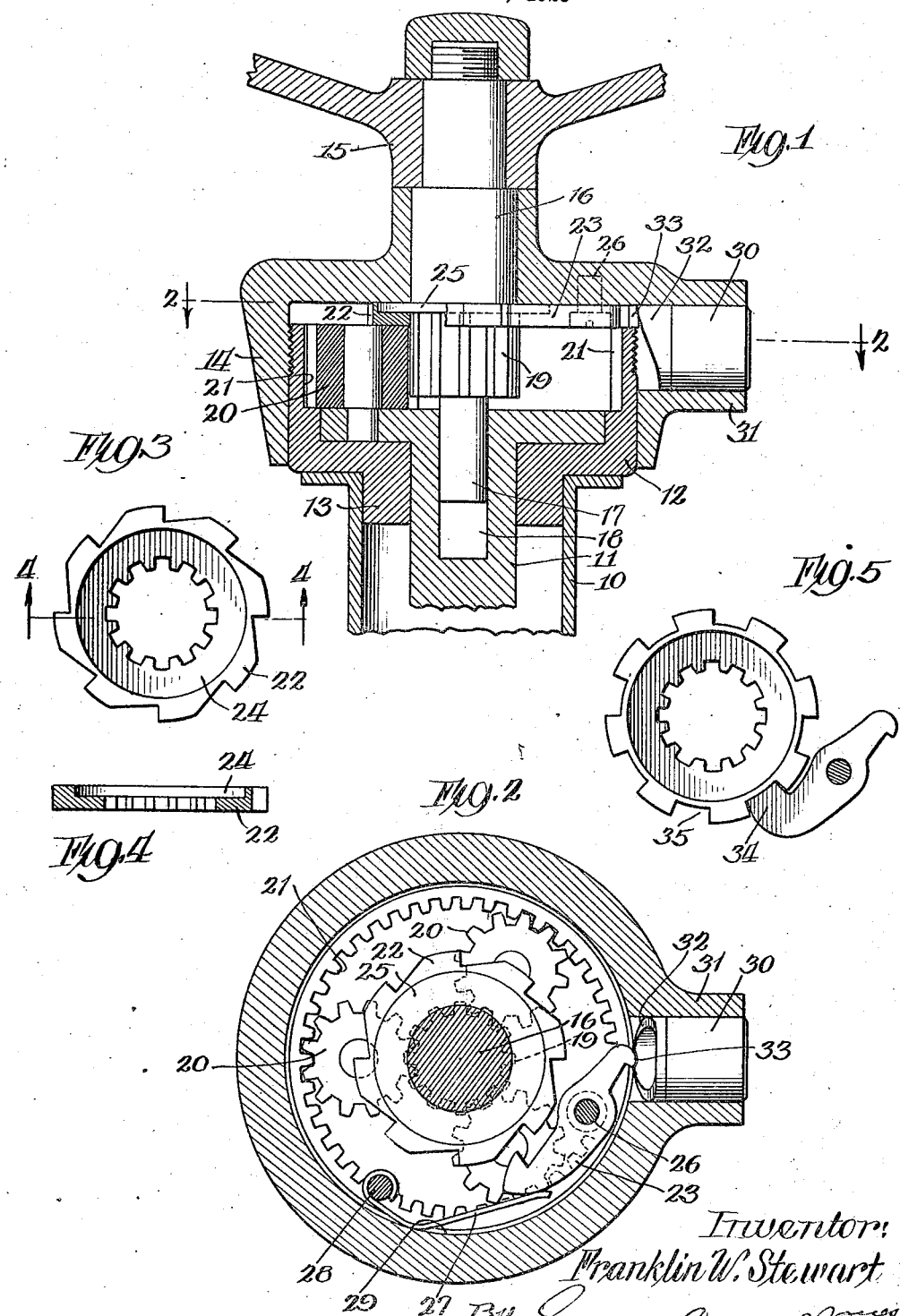

1,631,436

UNITED STATES PATENT OFFICE.

FRANKLIN W. STEWART, OF CHICAGO, ILLINOIS.

STEERING-WHEEL LOCK FOR AUTOMOBILES.

Application filed December 7, 1923. Serial No. 679,089.

My invention relates to improvements in steering wheel locks for automobiles, particularly those of the planetary gear type, such as used on Ford cars. The main object of the invention is to provide a very simple locking means which can be applied to the planetary gear mechanism with practically no change therein, other than a substitution of one cover for another which may be effected by anyone, without the services of a skilled mechanic.

Another object is to provide an improved lock which permits the front wheels of the vehicle to be turned in one direction but not in the other. This makes it possible to push the automobile a short distance although it is impracticable to drive it in the usual manner along the street, as it turns in a circle.

Further objects and advantages will be apparent from the following description of one embodiment of the invention which is illustrated in the accompanying drawings.

Figure 1 is a sectional elevation of the planetary gear housing and associated parts.

Fig. 2 is a section on the line 2—2 of Fig. 1.

Fig. 3 is a plan view of the locking pawl.

Fig. 4 is section on line 4—4 of Fig. 3.

Fig. 5 is a plan view of a modified form of locking pawl.

Except as hereinafter noted, the steering wheel mechanism comprises the usual well known parts including the steering post housing 10 which encloses the steering post 11 with the planetary gear housing 12 arranged at the upper end of said steering post housing and having a depending flange 13 which fits a correspondingly shaped opening and which has a circular center opening providing a bearing for the upper end of steering wheel post 11.

The planetary gear housing 12 is provided initially with a cap having screw threaded engagement therewith. In using this improved lock this cap, not shown, is removed and a special cap 14 substituted therefor, which cap is shown as simply screwed down in place of the usual cap. Above the cap, the steering wheel 15 is mounted in the usual manner on a short shaft 16, the latter having a reduced extension 17, at the lower end, which has a bearing in a central opening 18 in the post 11. The sun gear 19, which is mounted on the shaft 16 to turn therewith, and said shaft itself, comprise part of the original equipment. Said sun gear meshes with the planetary gears 20 which in turn mesh with the annular gear 21 formed in the circular wall of the housing 12. The only additional parts added to the original mechanism within said housing, are the ratchet and pawl 22 and 23 and small associated parts.

The ratchet shown in Figs. 3 and 4 has a notched central opening enabling it to be slipped over the sun gear 19 and it has a recess 24 in the upper face thereof, allowing it to fit over the flange 25 forming an integral part of the shaft 16. Said ratchet, which resembles a washer in thickness, has no effect on the operation of the sun and planetary gears. The sun gear does not extend as far down as it does normally but is elevated corresponding to the thickness of the ratchet 22. The pawl 23 is mounted on a stud 26 and has its ratchet engaging end normally pressed inwardly by a suitable spring 27, said spring being mounted on a stud 28 and being bent preferably to engage the annular wall 29 of the cap 14 so that it need not be anchored to the stud 28 or the latter anchored in said cap to prevent rotation.

It will be seen that the pawl and ratchet normally engage each other under the influence of the spring thereby preventing turning of the front wheels of the vehicle in one direction but permitting them to be turned in the other direction.

With this arrangement the driver, as he stops the car, gives the steering wheel a turn to the left directing the front wheels outwardly at an angle to the curb so that in case of fire, for example, the car may be pushed a certain distance, somewhat diagonally across the street to prevent interference with a fire plug. In case of an attempted theft however, the machine can turn only in a circle.

To render the steering wheel effective for normal use, a suitable lock 30 is provided which is preferably of cylindrical type and is received within an extension 31 of the cover 14. Any suitable means may be provided whereby rotation of the barrel of said lock actuates the pawl to release it from the ratchet. The drawings show a simple device consisting of a cam surface 32 at the inner end of the rotating barrel which cam surface depresses one end of the pawl against the action of the spring, thereby withdrawing the other end from the ratchet. Said cam has a notch 33 therein into which one end of the pawl snaps thereby holding it against accidental disengagement, although, it may be disengaged by using a slight pressure in turning the key. In Fig. 5 the pawl and ratchet have square teeth 34, 35 by means of which the wheel is locked against movement in either direction.

In both forms of the device it will be seen that the spring normally impels the pawl in a direction to lock the steering wheel against rotation; the unlocking position being the one in which the cam overcomes the spring. With this arrangement, if the spring should break the driver may continue to steer the car in the usual manner thereby avoiding an accident which would occur if the reverse arrangement were effected, whereby the pawl might accidentally lock with the ratchet, preventing the proper steering of the vehicle.

It will also be noted that the cover of the planetary gear housing may be removed any time that the key is turned to such a position as to withdraw the pawl from the ratchet. In this position the pawl clears the ratchet as the cover is being unscrewed. However, unauthorized removal cannot be effected as a key is required which fits the particular lock. With this arrangement, the same key which locks the device to prevent theft of the car also locks the cover of the housing without the necessity for the usual supplemental locking means. Furthermore, if an attempt is made to break the lock for the purpose of stealing the car, any damage that is done to the lock can be readily repaired as the cover can be removed to gain access to the parts therein which are so concealed and protected as to make it impossible that any serious damage can be done. With certain types of locks now in existence the damage that can be done from without is such as to make it impossible to gain access to the mechanism within.

The construction illustrated is very simple. It can be economically manufactured and quickly assembled, the parts requiring very little machining, and the substitution of the new cap for the old one may be effected in a short time by anyone.

What I claim is:—

The combination with a steering wheel, of a shaft, a steering wheel post and a housing, planetary gears mounted in said housing, one of said gears being mounted on said shaft, a flange on said shaft of greater diameter than said gear, a ratchet wheel of greater diameter than said flange and having a recess therein which receives said flange and a spring pawl mounted within said housing whereby it normally engages said ratchet.

In testimony whereof, I have subscribed my name.

FRANKLIN W. STEWART.